[11] 3,586,846

| [72] | Inventor | Anthony J. Ley<br>Farnborough, England |
|---|---|---|
| [21] | Appl. No. | 780,448 |
| [22] | Filed | Dec. 2, 1968 |
| [45] | Patented | June 22, 1971 |
| [73] | Assignee | The Solartron Electronic Group Limited<br>Farnborough, England |
| [32] | Priority | Dec. 5, 1967 |
| [33] | | Great Britain |
| [31] | | 55184/67 |

[54] TRANSFER FUNCTION ANALYSIS
9 Claims, 7 Drawing Figs.

[52] U.S. Cl. .................................. 235/181,
307/229, 324/77, 331/53
[51] Int. Cl. ......................................... G06f 7/19
[50] Field of Search .......................... 235/181,
194; 324/57, 77, 158

[56] References Cited
UNITED STATES PATENTS

| 2,760,155 | 8/1956 | Kelly | 324/57 |
| 3,202,990 | 8/1965 | Howells | 235/181 X |
| 3,227,949 | 1/1966 | Oberbeck | 324/57 |
| 3,369,176 | 2/1968 | Palatinus | 324/57 |
| 3,399,299 | 8/1968 | Nichols | 235/181 |
| 3,453,534 | 7/1969 | Post | 235/181 X |

FOREIGN PATENTS

| 701,423 | 1/1941 | Germany | 324/57 (H) |

*Primary Examiner*—Malcolm A. Morrison
*Assistant Examiner*—Felix D. Gruber
*Attorneys*—William R. Sherman, Stewart J. Moore, Jerry M. Presson and Roylance, Kruger, Abrams, Berdo and Kane ABSTRACT: Testing the response of a system such as a servo to an input signal of a relatively high signal ($W_H$) while using a correlator which operates at relatively low frequencies (e.g. $W_L$). A signal of frequency $W_H$ and a signal of frequency ($W_H + W_{LB}$) or ($W_H - W_L$) are generated and one of these is applied to the system under test. The other signal is multiplied by the output signal from the system, and the thus-formed multiplied signal is compared with two signals of frequency $W_L$ which differ in phase. The signal of frequency ($W_H \pm W_L$) can be generated by multiplying each of two signals of frequency $W_H$ which differ in phase by a respective one of two signals of frequency $W_L$ which differ in phase, and adding (or subtracting) the thus-formed multiplied signals.

INVENTOR:
ANTHONY JOHN LEY

TRANSFER FUNCTION ANALYSIS

The present invention relates to the testing of servo and other systems, and concerns a method of and apparatus for measuring the frequency response of such systems.

The term "system" is intended to include any device which produces an effect, hereinafter referred to as an output signal, in response to a stimulus, hereinafter referred to as an input signal. Thus, the term includes not only a simple servo, but also, for example, an electrical component, or a complete manufacturing process. The system may, for example, be electrical apparatus or an electromechanical or hydraulic servo.

In the testing of such systems, the input signal applied to the system is compared with the output signal from the system to provide information concerning the response of the system to signals at the frequency of the input signal. This information may be provided, for example, in the form of the ratio of the amplitudes of the output and input signals and the phase angle therebetween, the polar coordinates; or in the form of the inphase and quadrature components of the output signal, the cartesian coordinates. The testing process is known as "transfer function analysis," and apparatus for carrying out transfer function analysis has been described in U.S. Pat. Nos. 2,837,718 and 3,340,469 and in British Pat. No. 1,074,624. Such apparatus typically comprises a variable frequency oscillator which provides output signals $\sin wt$ and $\cos wt$ of adjustable amplitude, and a correlator, the function of which will be described later.

The testing is usually carried out over a range of frequencies and the above-mentioned Pat. No. 3,340,469 described apparatus for use in the frequency range 0.00001 Hz. to 1500 Hz. An object of the present invention is to provide a method of and apparatus for testing at frequencies of up to the order of 1 MHz.

It is therefore an object of this invention to provide a new method of and apparatus for transfer function analysis for testing the response of such systems to input signals at relatively high frequencies, while using a correlator which can operate at relatively low frequencies.

This invention provides a method of and apparatus for testing the response of a system to an input signal of a relatively high frequency ($W_H$) using a correlator normally capable of operation at relatively lower frequencies. The method consists of generating a first signal of the high frequency $W_H$, generating a second signal having a frequency equal to the sum or difference of the frequency $W_H$ and a relatively low frequency $W_L$, applying either one of said first and second signals to the system under test, multiplying the output signal from the system by the other of said first and second signals, and comparing the thus-formed multiplied signal with two signals of the lower frequency $W_L$ which differ in phase.

In a preferred form of this aspect of the invention the generation of the second signal is achieved by generating another signal of the high frequency $W_H$ and differing in phase from said first signal by 90°, multiplying each signal of the high frequency by a respective one of two signals of the low frequency $W_L$ which differ in phase, e.g. by 90°, to provide two multiplied signals, and adding (or subtracting) the multiplied signals to provide the said second signal. Hereinafter the terms "adding" and "adder" are intended to include "subtracting" and "subtractor" respectively.

The invention further provides apparatus for testing the response of a system to an input signal of a relatively high frequency $W_H$ using a correlator normally capable of operation at relatively lower frequencies. The apparatus comprises a first generator for generating at an output thereof a first signal of the higher frequency $W_H$, and a second generator for generating at an output thereof a second signal having a frequency equal to the sum or difference of the frequency $W_H$ and a relatively low frequency $W_L$. Means is provided for connecting a preselected one of the said generator outputs to the input of a system to be tested. A multiplier has one input connected to the other of the said first and second generator outputs and another input connected to the output of a system to be tested the correlator is connected to receive the output of the multiplier and two signals of the lower frequency which plate in phase and is arranged to provide an output signal dependent upon the response of the system to an input signal of frequency $W_H$.

One specific form of this aspect of invention the first generator has a second output for supplying a signal of the high frequency $W_H$ differing in phase by 90° from the first output of the first generator. A third generator comprises second and third multipliers each having one input connected to receive a respective $W_H$ frequency signal output of the first generator and a second input connected to receive a respective one of two signals, an adder connected to the outputs of the second and third multipliers and having an output for providing a signal having a frequency equal to the sum or difference of the frequency $W_H$ and a relatively low frequency $W_L$.

Certain embodiments of the invention will now be described, by way of example, with reference to the accompanying drawings, in which.

Figure 1:
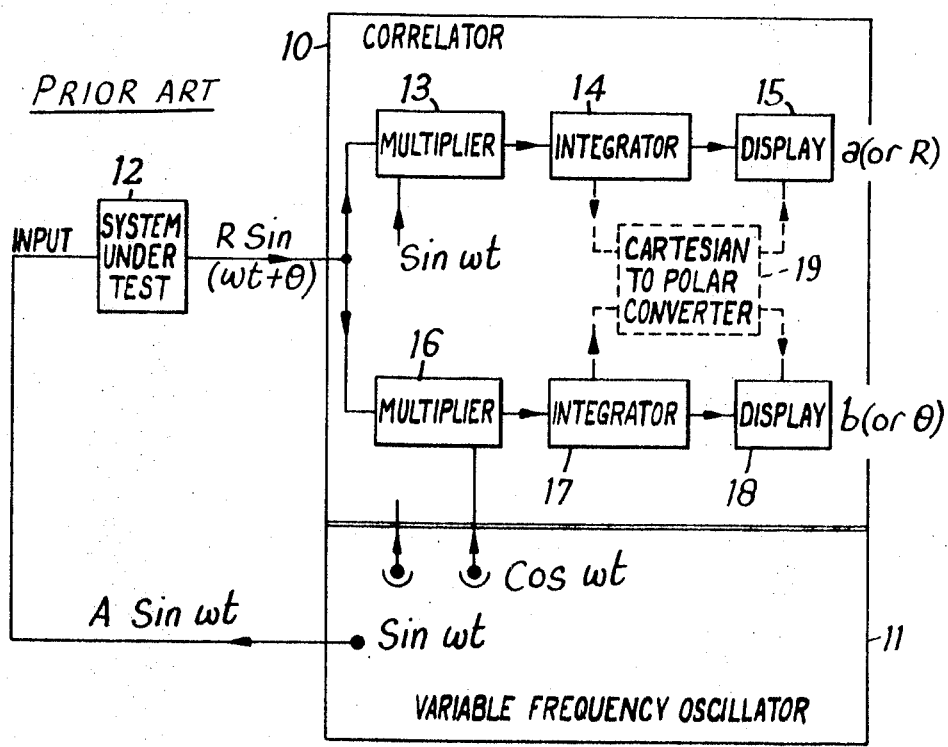
FIG. 1 shows a block diagram of a known transfer function analyzer.

The known transfer function analyzer shown in FIG. 1 and designated "Prior Art" includes a conventional correlator or comparator 10 and a variable-frequency oscillator 11 which provides signals $\sin wt$ and $\cos wt$ of variable amplitude and frequency. The correlator 10 comprises two signal paths having multipliers 13 and 16 respectively, integrators 14 and 17 and displays 15 and 18 connected in series. The displays 15 and 18 provide a cartesian ($a,b$) display, but a cartesian-to-polar converter 19 may be included to provide a polar ($R,O$) display in addition or instead.

In operation, the system 12 under test is connected between an output of the oscillator 11 and the correlator 10, and receives an input signal $A \sin wt$ from the oscillator. The output signal from the system 12 is a complex waveform comprising the test signal together with harmonics caused by nonlinearity and noise generated within the system. The test signal suffers amplitude and phase distortion, the degree of which is related to the transfer function of the system. The fundamental component of the output signal may be written as $R \sin (wt+\theta)$, wherein $\theta$ is the phase difference between the input and output signals.

The in-phase ($a$) and quadrature ($b$) components of the output signal with respect to the input signal are determined in the correlator 10. The output signal from the system 12

$= R \sin (wt+\theta)$ which may be written $\quad R \sin wt \cdot \cos \theta + R \cos wt \cdot \sin \theta$ $= a \sin wt + b \cos wt \quad (1)$ (in phase component) + (quadrature component)

where $a = R \cos \theta$, $b = R \sin \theta$.

In the multiplier 13, the output signal $R \sin (wt+\theta)$ is multiplier by $\sin wt$ obtained from the oscillator. The output of the multiplier 13 is therefore $\sin wt \, (a \sin wt + b \cos wt)$ $= a \sin^2 wt + b \cos wt \cdot \sin wt$.

This is applied to the integrator 14 where it is integrated (or averaged) over a finite number of cycles. The average value of $\cos wt \cdot \sin wt$ over one cycle is zero, so that the output of the integrator 14

$$= \frac{1}{2\pi N} \int_0^{2\pi N} a \sin^2 wt \, d(wt)$$

$$= \frac{a}{4\pi N}[wt - \sin wt \cdot \cos wt]_0^{2\pi N}$$

$$= \frac{a}{2}$$

The integrator 14 or the display 15 can be so scaled that the value of $a$ is displayed directly by the display 15.

In the multiplier 16, the output signal $R \sin(wt+\theta)$ is multiplied by $\cos wt$. By reasoning similar to that given above, it can be shown that the output of the integrator 17 is $b/2$, so that the quadrature component $b$ of the output signal is displayed on the display 18.

The average value of any harmonic of the reference frequency $w$ is zero when integrated over a complete cycle, so harmonics can be ignored in the above calculations.

A more detailed description of circuits suitable for use in the transfer function analyzer shown in FIG. 1 are given in our aforementioned specifications, for example.

Figure 2:
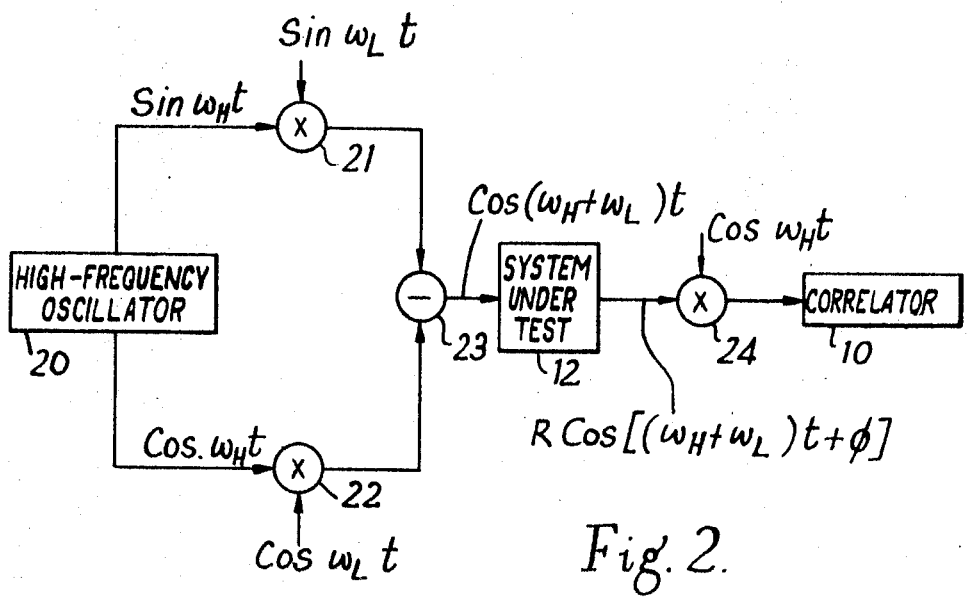
FIG. 2 shows a block diagram of apparatus embodying the invention.

The apparatus embodying the present invention and shown in FIG. 2 has a variable-high-frequency oscillator 20 with two outputs providing signals $\sin w_H t$ and $\cos w_H t$. A second generator (not shown) corresponding to the oscillator 11 of FIG. 1 provides signals $\sin w_L t$ and $\cos w_L t$, where $w_L$ is considerably smaller than $w_H$. A multiplier 21 multiplies $\sin w_H t$ by $\sin w_L t$, and a multiplier 22 multiplies $\cos w_H t$ by $\cos W_L t$. The two multiplied signals are applied to an adder 23 which subtracts one of the multiplied signals from the other. When the apparatus is in use, the system 12 under test has its input connected to the output of the adder 23, and its output connected to a third multiplier 24, which multiplies the output signal from the system 12 by $\cos w_H t$ derived from the oscillator 20. The output of the third multiplier 24 is then applied to a correlator 10, such as the correlator 10 shown in FIG. 1.

In operation, the outputs of the multipliers 21 and 22 respectively are $\sin w_H t \cdot \sin w_L t$ and $\cos w_H t \cdot \cos w_L t$. These two signals are subtracted in the adder 23 to give $\cos w_H t \cdot \cos w_L t - \sin w_H t \cdot \sin w_L t +$
$\cos(w_H w_L)t.$ This is the input signal which is applied to the system 12 under test. The input signal to the system is modified by the system and the output will have a fundamental component of the form $R \cos(w_H + a[w_L)t + \Phi]$. This signal is now multiplied by $\cos w_H t$ to give:

$R \cos[(w_H + w_L)t + \Phi] \cdot \cos w_H t =$
$(R/2)\{\cos[(2w_H w_L)t + \Phi] + \cos(w_L t +)\}$.

This signal is applied to the correlator 10, but the correlator is unable to respond to the signal of the relatively high frequency $(2w_H + \alpha \cdot w_L)$ and thus "sees" only the signal $R/2 \cos(w_L t +)$ which is of the lower frequency $w_L$. The correlator 10 can process this signal to provide a display of $R/2$ and $\Phi$, if the cartesian-to-polar converter 19 is used, or to give the cartesian coordinates of the signal $(R/2)\cos\Phi$ and $(R/2)\sin\Phi$. The display can be scaled by a factor of two to provide a direct reading of $R$ or of $R\cos\Phi$ and $R\sin\Phi$.

Any nonlinear device can be used as the multipliers 21, 22 and 24, since any harmonics generated within the multiplier will be rejected by the correlator, which responds only to low frequencies and hence to the $\cos(w_L t + \Phi)$ term. An example of a suitable multiplier is described in U.S. Pat. application Ser. No. 530,949 filed Mar. 1, 1966, now U.S. Pat. No. 3,440,441.

In a practical arrangement the input signal applied to the system 12 will generally contain harmonics of the low frequency signals $\sin w_L t$ and $\cos w_L t$. The output signal from the system, including these harmonics and any harmonics generated due to the nonlinearity of the system 12 is multiplied by $\cos w_H t$ (and its harmonics) and the resultant multiplied signal is complex. However the correlator effectively filters out all these harmonics to process only the signal $(R/2) \cos(w_L t+)$.

Since the correlator 10 rejects unwanted harmonics, it is possible to replace the multipliers 21, 22 and 24 by switches, thereby, in effect, multiplying by square waves rather than sine waves. As the switches 21 and 22 may typically operate at a frequency of the order of 10 Hz., they may be relays or transistor switches. The multiplier 24 which has to operate at a higher frequency could be a transistor switch.

The adder 23 may be an operational amplifier connected as a summing amplifier. To obtain the correct polarity for the $\sin w_H t \cdot \sin w_L t$ signal an inverter can be included in the adder 23. However, if the inverter were omitted, the output of the adder 23 would be $\sin w_H t \cdot \sin w_L t + \cos w_H t \cdot \cos w_L t$
$\cos(w_H - w_L)t.$ The output signal from the system 12 would then be $R \cos[(w_H - w_L)t\Phi]$ and the input to the correlator is then $R \cos[(w_H - w_L)t\Phi] \cdot \cos w_H t =$
$(R/2)\{\cos[(2w_H - w_L)t + \Phi] + \cos(-w_L t + \Phi)\}$
$= (R/2)\{\cos[(2w_H - w_L)t + \Phi] + \cos(w_L t - \Phi)\}$ since $\cos x = \cos(-x)$, which can also be processed by the correlator 10.

It can also be shown that the multipliers 21 and 22 and adder 23 can be arranged to supply either of the signals $\sin w_H t \cdot \cos w_L t \pm \cos w_H t \cdot \sin w_L t =$
$\sin(w_H \pm w_L)t$ to the system 12.

The multiplying signal applied to the multiplier 24 need not be $\cos w_H t$ but may be $\sin w_H t$ or any signal of frequency $W_H$, i.e. $\cos(w_H t + \Phi)$, since the phase angle $\theta$ will appear in the display as a constant added to $\Phi$, and correction may simply be made for this.

Figure 3:
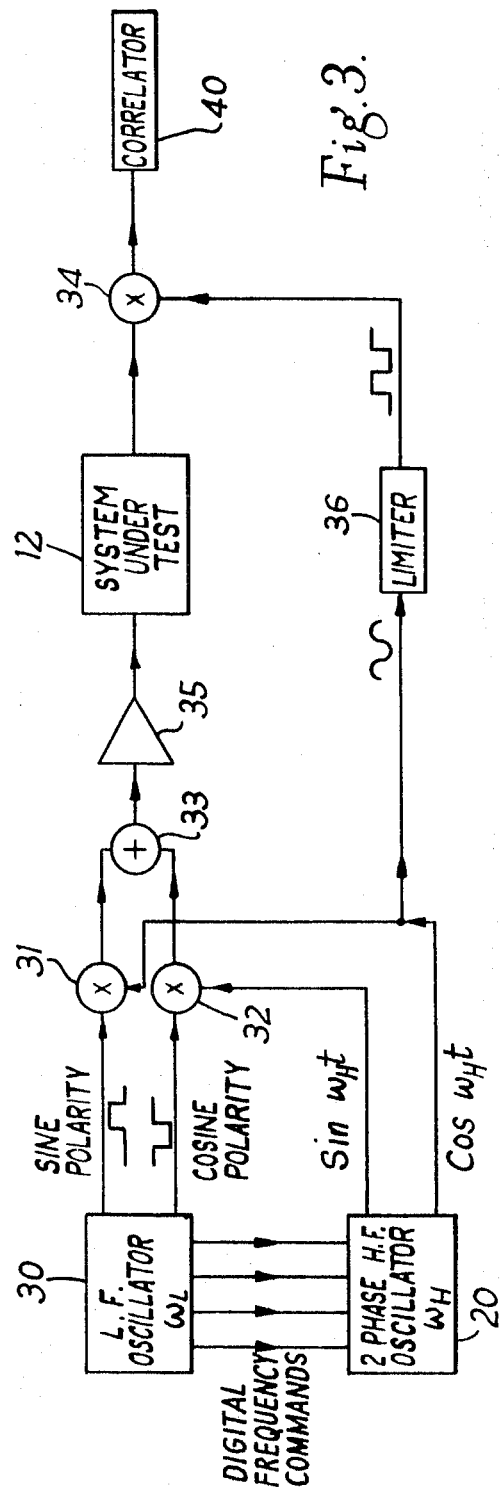
FIG. 3 shows a block diagram of apparatus embodying the invention using a generator of the type described in the aforementioned Pat. No. 1,074,624.

The apparatus illustrated in FIG. 3 is based on the transfer function analyzer described in the aforementioned Pat. No. 1,074,624, and shown in FIG. 7 thereof. The analyzer shown in FIG. 3 is basically similar to that shown in FIG. 2. Respective outputs of a high frequency oscillator 20 and a low frequency oscillator 30 are combined in multipliers 31 and 32, and the multiplied signals are applied to an adder 33. The output of the adder 33 is applied through an amplifier or attenuator 35 to the system under test 12, and the output signal from the system 12 is multiplied in a multiplier 34 by a signal of the high frequency derived from the oscillator 20. The output of the multiplier 34 is applied to a correlator 40, which may be similar to the correlator 10 of FIG. 1.

The multipliers 31, 32 and 34 are transistor switches, and the LF oscillator 30 generates square wave signals one with sine and the other with cosine polarity, (in addition to the sinusoidal signals applied to the correlator). The HF oscillator 20 generates sine and cosine waves, but a limiter 36 is included to provide a square wave for controlling the switch 34.

The frequency of the HF oscillator 20 is automatically determined by the setting of the frequency controls of the LF oscillator 30. For example, if the frequency of the LF oscillator 30 is set to 15.99 Hz., the frequency of the HF oscillator 20 is automatically set by digital frequency commands to 159.9 kHz.

The operation of the analyzer is otherwise exactly similar to that shown in FIG. 2.

Figure 4:
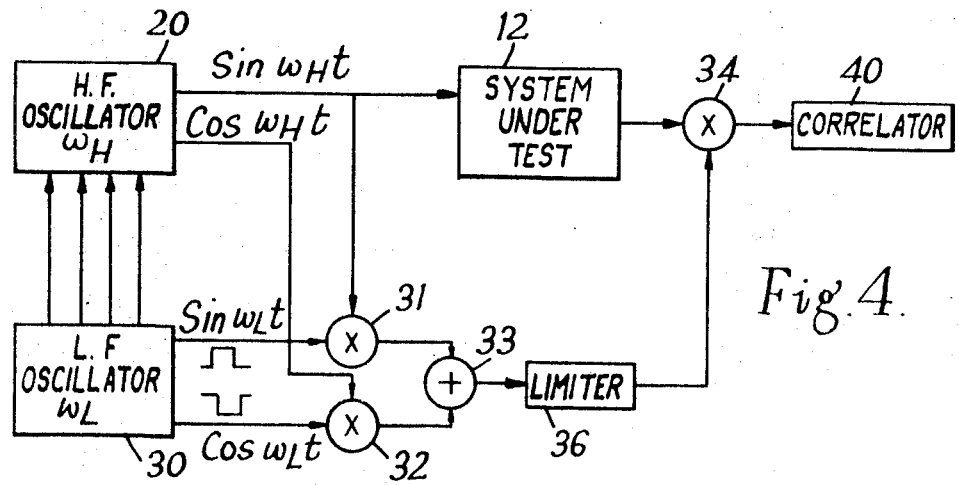
FIG. 4 shows a block diagram of an alternative arrangement of the apparatus of FIG. 3.

FIG. 4 shows an alternative arrangement of the apparatus of FIG. 3, in which the signal $\sin W_H t$ is passed through the system 12 under test and the signal $\cos(W_H - W_L)t$ is passed through the limiter 36 to the multiplier 34. The output of the system under test is $R \sin(W_H t + aB)$ and the output of the multiplier 34 is therefore $R \sin(W_H t + \Phi) \cdot \cos(W_H - W_L)t =$
$(R/2)\{\sin[(2W_H W_L)t + \Phi] + \sin(W_L t + \Phi)\}.$ The correlator 40 will respond only to the term $R \cdot \sin(W_L t + \Phi)$.

Figure 6:
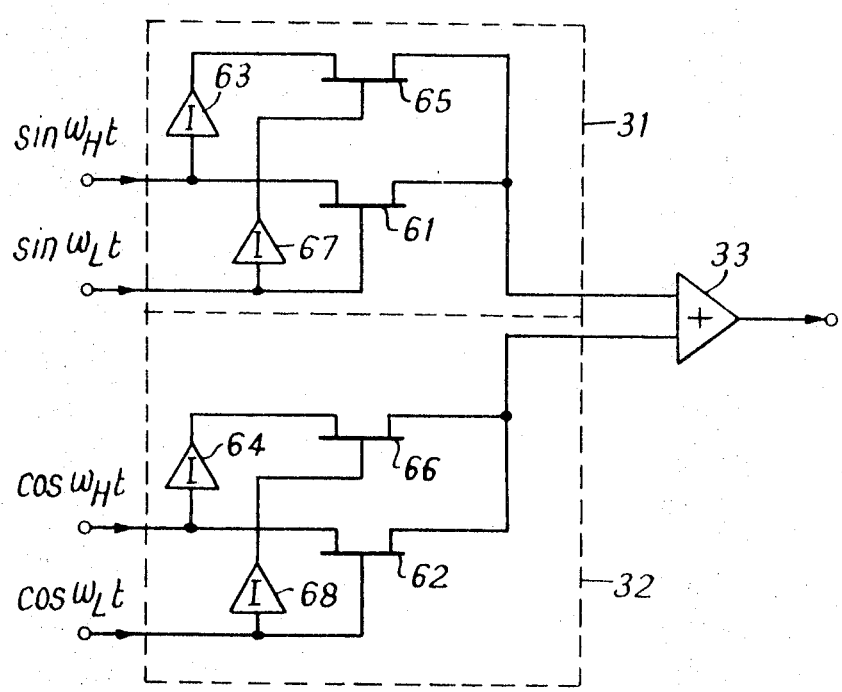
FIG. 6 is a circuit diagram showing the elements 31, 32 and 33 of FIG. 4.

The multipliers 31 and 32 of FIG. 4 may be of the type shown in FIG. 6. As shown, the high frequency signals $\sin W_H t$ and $\cos W_H t$ are applied directly to the drains of two field-effect transistors 61 and 62, and through inverters 63 and 64 to the drains of two field-effect transistors 65 and 66. The low frequency square wave signals $\sin W_L t$ and $\cos W_L t$ are applied directly to the gates of transistors 61 and 62 and through inverters 67 and 68 to the gates of transistors 65 and 66. The sources of transistors 61 and 65 are connected together to one input of a summing amplifier constituting the adder 33, and the sources of transistors 62 and 66 are connected together to another input of the summing amplifier.

Figure 7:
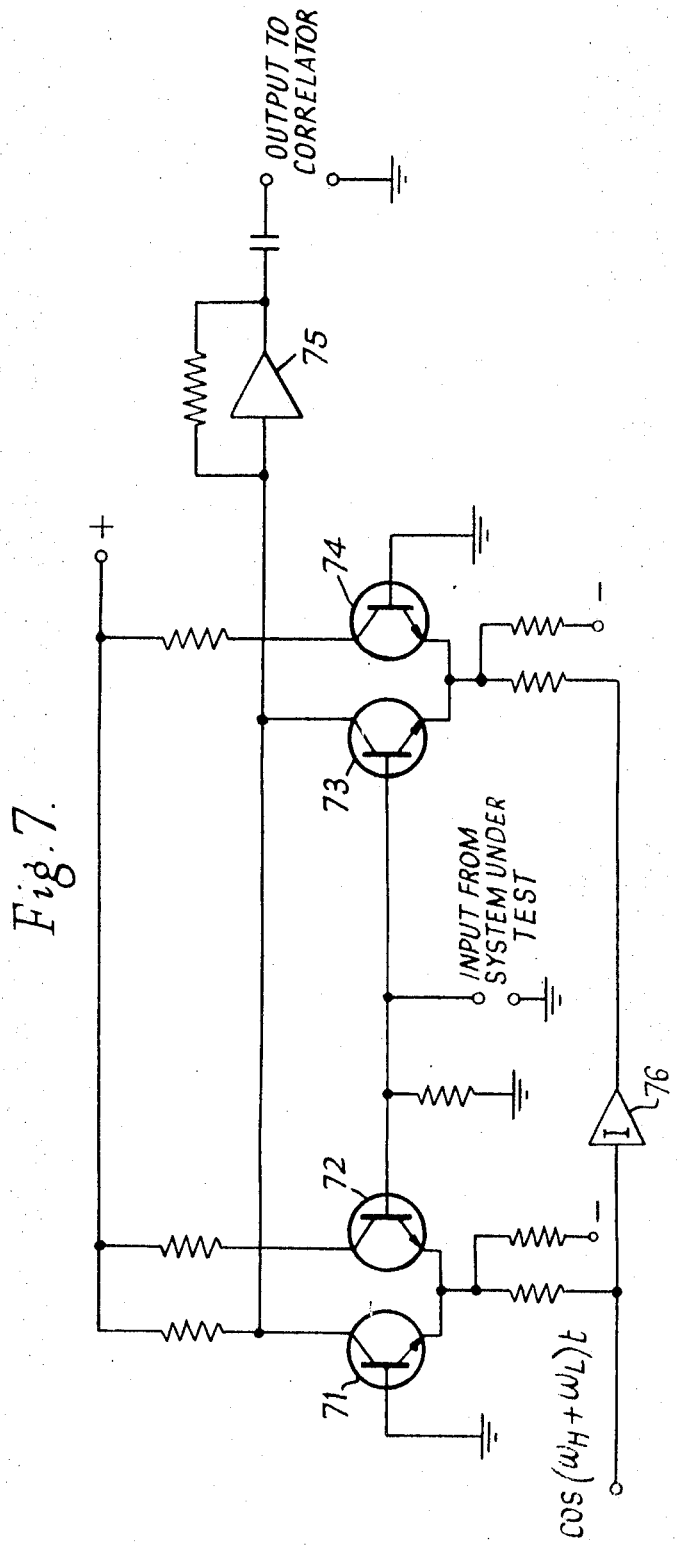
FIG. 7 is a circuit diagram of the multiplier 34 of FIG. 4.

The multiplier 34 of FIG. 4 may be a balanced multiplicative modulator of the type shown in FIG. 7, in which case the limiter 36 may be omitted. The multiplicative modulator shown in FIG. 7 is based upon the multiplicative modulator described with reference to and shown in FIG. 1 of the aforementioned U.S. Pat. No. 3,440,441, to which reference should be made for a full description of the circuit and of its operation. Briefly, the circuit includes four transistors 71, 72, 73 and 74 connected in two long-tailed pair circuits, the collector of one transistor of each long-tailed pair being connected to an operational amplifier 75 and hence to the correlator 40 of FIG. 4. The output from the system under test is applied to the bases of the transistors 72 and 73, the bases of transistors 71 and 74 being connected to earth. The signal $\cos (W_H + W_L)t$ from the adder 33 of FIG. 6 is applied directly to the emitters of transistors 71 and 72, and through an inverter 76 to the emitters of transistors 73 and 74. It is shown in the aforementioned U.S. Pat. No. 3,440,441 that the signal obtained at the output is accurately proportional to the product of the two input signals, which in this case are $\cos (W_H + W_L)t$ and the output from the system under test.

Figure 5:
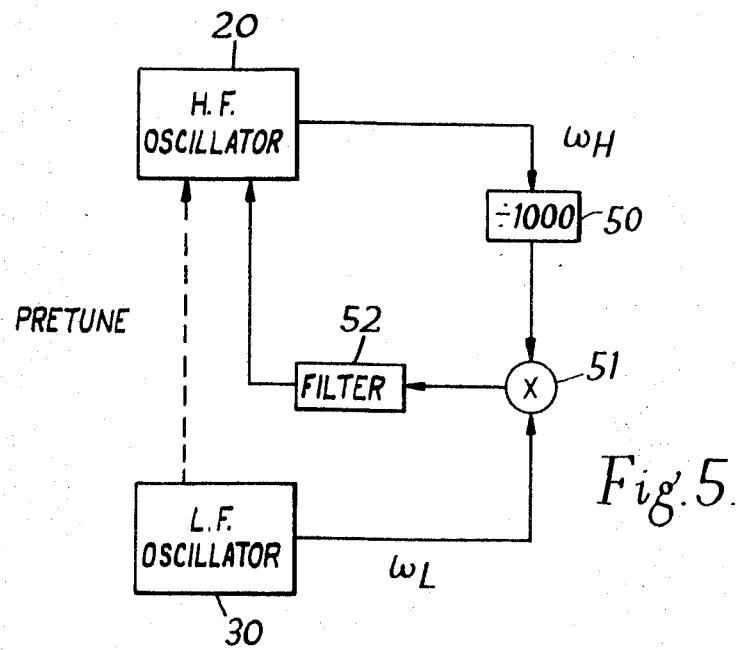
FIG. 5 shows apparatus for phase locking the output of the high frequency oscillator to that of the low frequency oscillator for use in the apparatus of FIG. 3 or FIG. 4.

FIG. 5 illustrates one method of locking the frequency of the output of the high frequency oscillator 20 to that of the low frequency oscillator 30. The apparatus shown is suitable for incorporation into the apparatus of FIG. 3 or of FIG. 4. The high frequency oscillator 20 is pretuned to within about 10 percent of the desired frequency, which in this case is 1000 times the frequency of the low frequency oscillator 30. In this case the high frequency oscillator is voltage-controlled, and the pretuning may be effected by the frequency selector switches for control the low frequency oscillator.

One output from the high frequency oscillator is passed to a frequency divider 50 which divides the frequency by 1000. The output $W_L'$ of the divider 50 is applied to a multiplier 51 together with a signal of the low frequency $W_L$ from the output of the low frequency oscillator 30. The output of the multiplier 51 will consist of a component having a frequency equal to $W_L + AQL'$ added to a component having a frequency equal to $W_L - AQL'$. The output of the multiplier 51 is connected to a low-pass filter 52 which passes only the component having a frequency $W_L - W_L'$. The voltage output of the filter 51 is then used to correct the frequency of the voltage-controlled oscillator 20.

I claim:

1. A method of testing the response of a system to an input signal of a relatively high frequency ($W_H$) using a correlator capable of operating at relatively lower frequencies, said method comprising the steps of:
    generating a first signal of said higher frequency $W_H$;
    generating a second signal of a relatively lower frequency $W_L$;
    generating a third signal having a frequency equal to one of the set comprising the sum and difference of the frequencies of said first and second signals;
    applying a preselected one of said first and third signals to a system under test;
    generating an output signal from said system corresponding to the response of the system to the signal applied thereto;
    multiplying the output signal from said system by the other one of said first and third signals to provide a multiplied signal;
    generating a further signal of relatively lower frequency $W_L$ differing in phase from said second signal; and
    applying the multiplied signal to a correlator, together with said second and further signals of relatively lower frequency to provide an output signal indicative of the response of the system to an input signal of frequency $W_H$.

2. A method according to claim 1, wherein said two signals of the lower frequency $W_L$ differ in phase by 90°.

3. A method according to claim 1, wherein said step of generating a third signal comprises:
    generating a further signal of said high frequency $W_H$ differing in phase from said first signal by 90°;
    multiplying said first and said further signals of frequency $W_H$ by a respective one of said second and further signals of said low frequency $W_L$ to provide two multiplied signals; and
    adding said multiplied signals to provide said third signal.

4. A method according to claim 3, wherein said second and further signals of frequency $W_L$ which multiply said first and further signals of frequency $W_H$ differ in phase by 90°.

5. A method according to claim 1, wherein said third signal is applied to the system under test.

6. Apparatus for testing the response of a system to an input signal, said apparatus comprising:
    a first generator for generating at an output thereof, a first signal of a high frequency $W_H$;
    a second generator for generating at two outputs thereof, two signals of relatively low frequency $W_L$ and differing in phase by 90°;
    a third generator responsive to said first and second generator outputs for generating at an output thereof, a third signal having a frequency equal to one of the set comprising the sum and difference of said $W_H$ frequency signal and said $W_L$ frequency signal,
    means for coupling a preselected one of said first and third generator outputs to a system to be tested;
    a multiplier having a first input coupled to the other of said first and third generator outputs and a second input for coupling to the output of the system to be tested, said multiplier being responsive to signals coupled to said first and second inputs to provide a multiplied signal at an output thereof; and
    a correlator capable of operation at relatively low frequencies and coupled to the output of said multiplier for correlating said multiplied signal with said two signals of the lower frequency $W_L$ which differ in phase by 90° so as to provide an output signal indicative of the response of the system to an input signal of the frequency $W_H$.

7. Apparatus according to claim 6, wherein the frequency of said first generator is locked to the frequency of said second generator, so that the frequency ratio of the high frequency signal to the low frequency signal is thereby maintained at a predetermined factor.

8. Apparatus according to claim 6, wherein the first said multiplier comprises a multiplicative modulator.

9. Apparatus according to claim 7 and further comprising:
    a frequency divider having an input coupled to an output of said first generator and responsive to provide an output signal corresponding in frequency to said signal $W_H$ divided by said predetermined factor;
    a multiplier responsive to the output of said divider and to an output signal from said second generator for providing a signal indicative of the frequency difference between said second generator signal and said divider output signal; and
    means coupling said multiplier output signal to said first generator to provide a signal to lock the frequency of said first generator to a predetermined multiple of said second generator frequency, thereby to provide the frequency ratio of said high frequency signal to said low frequency signal at said predetermined factor.